US012565388B2

(12) United States Patent
Plant et al.

(10) Patent No.: US 12,565,388 B2
(45) Date of Patent: Mar. 3, 2026

(54) GLASS CUTTING LINE WITH AUTOMATIC REMNANT STORAGE AND RETRIEVAL INCLUDING CUTTING TABLE WITH INTEGRATED SQUARING STOP AND Y-BREAK BREAKING BAR FACILITATING SUB-PLATE CUTTING

(71) Applicant: Billco Manufacturing Incorporated, Zelienople, PA (US)

(72) Inventors: Phillip David Plant, Butler, PA (US); Darin Vietmeier, Zelienople, PA (US)

(73) Assignee: BILLCO MANUFACTURING INCORPORATEI, Zelienople, PA (US)

( * ) Notice: Subject to any disclaimer, the term of this patent is extended or adjusted under 35 U.S.C. 154(b) by 219 days.

(21) Appl. No.: 18/208,821

(22) Filed: Jun. 12, 2023

(65) Prior Publication Data

US 2024/0409450 A1     Dec. 12, 2024

Related U.S. Application Data

(63) Continuation of application No. 17/013,711, filed on Sep. 7, 2020, now Pat. No. 11,673,749.

(60) Provisional application No. 62/896,738, filed on Sep. 6, 2019.

(51) Int. Cl.
| | |
|---|---|
| *B65G 49/06* | (2006.01) |
| *B26F 1/38* | (2006.01) |
| *C03B 33/03* | (2006.01) |
| *C03B 33/033* | (2006.01) |

(52) U.S. Cl.
CPC .......... *B65G 49/061* (2013.01); *B26F 1/3813* (2013.01); *B65G 49/063* (2013.01); *B65G*
49/067 (2013.01); *C03B 33/03* (2013.01); *C03B 33/033* (2013.01); *C03B 2225/02* (2013.01)

(58) Field of Classification Search
CPC .................................................... C03B 33/023
See application file for complete search history.

(56) References Cited

U.S. PATENT DOCUMENTS

| | | | | | |
|---|---|---|---|---|---|
| 2,705,389 | A | * | 4/1955 | Wyman ................. | C03B 33/033 |
| | | | | | 225/96.5 |
| 2,711,617 | A | * | 6/1955 | Trammell, Sr. ....... | C03B 33/027 |
| | | | | | 83/485 |
| 2,948,991 | A | * | 8/1960 | Walters ................. | C03B 33/023 |
| | | | | | 53/435 |

(Continued)

FOREIGN PATENT DOCUMENTS

| | | | | | |
|---|---|---|---|---|---|
| CA | 1151995 | A | * | 8/1983 | ............ B26F 1/3853 |
| EP | 0048334 | A1 | | 3/1982 | |

(Continued)

*Primary Examiner* — Alison L Hindenlang
*Assistant Examiner* — Steven S Lee
(74) *Attorney, Agent, or Firm* — Blynn L. Shideler; Krisanne Shideler; BLK Law Group

(57) ABSTRACT

A glass cutting line includes automatic remnant storage and retrieval including cutting table with integrated squaring stop and y-break breaking bar facilitating sub-plate cutting. The cutting table is configured for sub-plate cutting mode which provides the ability to cut portions of a stock sheet and release the cut portion in the form of a remnant and or individual workpieces to breakout before the entire sheet is finished scoring without the sub-plate leaving the cutting table.

13 Claims, 5 Drawing Sheets

(56)　　　　　　References Cited

U.S. PATENT DOCUMENTS

| | | | | |
|---|---|---|---|---|
| 3,183,747 | A * | 5/1965 | Insolio | C03B 33/023 83/365 |
| 3,286,893 | A | 11/1966 | Zellers | |
| 3,570,733 | A * | 3/1971 | Allen | C03B 33/033 225/104 |
| 3,889,862 | A * | 6/1975 | Insolio | C03B 33/12 83/881 |
| 5,005,318 | A | 4/1991 | Shafir | |
| 5,791,971 | A * | 8/1998 | Dickinson | C03B 33/027 83/318 |
| 6,138,546 | A * | 10/2000 | Hursey | C03B 33/12 83/578 |
| 6,463,762 | B1 | 10/2002 | Ross, Jr. | |
| 6,810,784 | B1 | 11/2004 | Cunningham | |
| 7,217,077 | B2 | 5/2007 | Mercure | |
| 7,255,253 | B2 | 8/2007 | Wirsam | |
| 7,866,185 | B2 | 1/2011 | Adriaansen et al. | |
| 7,878,754 | B2 | 2/2011 | Mercure | |
| 8,647,042 | B2 | 2/2014 | Plant et al. | |
| 2007/0214925 | A1 * | 9/2007 | Nishio | B28D 5/0011 83/559 |
| 2009/0199694 | A1 | 8/2009 | Uh | |
| 2010/0011935 | A1 * | 1/2010 | Plant | B65G 49/067 83/879 |
| 2021/0070556 | A1 | 3/2021 | Plant | |

FOREIGN PATENT DOCUMENTS

| | | | | | |
|---|---|---|---|---|---|
| FR | 2545815 | A1 * | 11/1984 | | C03B 33/03 |
| JP | 5006411 | B2 | 8/2012 | | |

* cited by examiner

*Fully Automated Standard*

*Fully Automated Double*

TRANSFER PLATE

BEARINGS

TIE BAR

AIR CYLINDER

18

12

BEARINGS

60

BREAKER BAR

10

20

TRANSFER PLATE

22

14

GLASS CUTTING LINE WITH AUTOMATIC REMNANT STORAGE AND RETRIEVAL INCLUDING CUTTING TABLE WITH INTEGRATED SQUARING STOP AND Y-BREAK BREAKING BAR FACILITATING SUB-PLATE CUTTING

RELATED APPLICATIONS

The present application is a continuation of U.S. patent application Ser. No. 17/013,711 filed Sep. 7, 2020 and published Mar. 11, 2021 as publication number 2021/0070556, and which issued Jun. 13, 2023 as U.S. Pat. No. 11,673,749, which publication and application are incorporated herein by reference. U.S. patent application Ser. No. 17/013,711 claims the benefit of U.S. Provisional Patent application Ser. No. 62/896,738, filed Sep. 6, 2019, titled "Glass Cutting Line with Automatic Remnant Storage and Retrieval including Cutting Table with Integrated Squaring Stop and Y-Break Breaking Bar Facilitating Sub-Plate Cutting", and incorporated herein by reference.

BACKGROUND OF THE INVENTION

1. Field of the Invention

Billco Manufacturing, Inc. (Billco) has developed the present invention which relates to glass cutting lines incorporating remnant storage solutions and cutting line efficiencies.

2. Background Information

Glass processing equipment includes glass cutting lines. Glass cutting lines are well known in the industry and some typically critical components of a glass cutting line includes a cutting table having a movable cutting head (such as though an XY positioning system) configured to cut glass workpieces on the table. Glass cutting tables are available from the assignee of this invention, Billco and others. Examples of glass cutting lines are described in U.S. Pat. Nos. 5,791,971, 6,463,762, 6,810,784, 7,255,253, 7,866,185, which are incorporated herein by reference.

Glass workpieces within the meaning of this application references all glass workpieces throughout glass processing, including stock lites (also called sheet or plates), sub-plates (discussed below), individual cut pieces and remnants (also called offal pieces, or offcuts). Remnant glass workpieces are generally referencing the portion of a stock lite (or sheet or plate) that remains after cutting one or more workpieces there from, wherein the remnant is large enough to meaningfully obtain future needed workpieces therefrom, and whereby it is efficient to store the remnant for future reuse rather than scrap the unused portion. The remnant is, effectively, a cut workpiece that is too large to scrap.

The phrase scrap glass has been in the industry used to reference merely the unused portion of a specific workpiece in one given run and such a definition would thus encompass both remnant glass workpieces and those that are to be discarded or scrapped. The phrase scrap glass has also been used more narrowly to reference only that glass workpiece remaining that is not reused and is discarded, in other words the cut workpiece portions other than remnants. The different meanings can sometime be attributed to whether one is discussing a single production run or the glass processing line as a whole over a longer period of a number of production runs. Unless otherwise noted in this application a remnant is a cut workpiece portion that is deemed available for reuse and requires storage for later use and scrap glass is a cut workpiece portion that is not reused and discarded (i.e. scrapped).

Optimization software systems for glass cutting generally produce random size unused pieces or portions of the glass stock lite, at various times during the optimization process. These unused pieces may be discarded immediately if scrap glass, or re-used on a future cutting layout if it is a remnant. Historically, the problem with re-using the remnant pieces is where to store them until the optimization software determines an appropriate cut piece layout for a specific remnant. Manual racking and re-loading of the remnant pieces takes time and is prone to glass scratching during handling.

When a remnant piece is generated, special handling is required on many glass types to avoid destroying the remnant. Manual handling may be inefficient and inappropriate for many glass types. In view of these restrictions several semi-automatic remnant storage and retrieval systems have been proposed in the art. The storage devices can be a "cassette type" storage device. A cassette type storage device can be defined herein as a storage device which receives workpieces from the handler and delivers workpieces to the handler from any of a plurality of storage locations, often slots, within the cassette device. The control system will designate a storage location for a particular stored piece so the remnant workpiece can be recalled later when needed.

See for example U.S. Pat. Nos. 7,217,077 and 7,878,754, which are incorporated herein by reference and disclose a separate remnant storage system for use next to a glass processing line having a loading table, a glass cutting table and a breakout table. The storage system comprises a first tilt table and a second tilt table. A cassette storage rack is positioned between the first and the second tilt tables or upstream of the second tilt table. The storage rack comprises a plurality of parallel storage slots extending longitudinally within the main frame of the storage rack. The storage slots act to store the glass remnant at an almost vertical position of less than 90 degrees with reference to the horizontal. In use, the first tilt table receives horizontally-disposed glass remnants from the breakout table and sends it to the storage rack. The second tilt table receives previously-stored glass remnants from the storage rack to be directed to the loading table. This system has been commercialized by Bromer, Inc. Hegla, Inc. has also commercialized an analogous vertical type cassette storage rack under the RAPID STORE™ brand.

U.S. Pat. No. 8,647,042, by Billco, is incorporated herein by reference and discloses a glass cutting line which includes a cassette workpiece storage and retrieval unit positioned vertically below the loader table when the loader table is positioned to transport the glass workpieces to the cutting table. The cassette workpiece storage and retrieval unit receives glass workpieces from the cutting table and delivers workpieces to the cutting table from any of a plurality of storage locations. This remnant storage and retrieval system presented advantages where space prevented the remnant storage system from being positioned adjacent the cutting line. Hegla, Inc. developed an above-the-cutting-line cassette type storage system sold under the TANDOM-REMASTER™ brand.

In a glass cutting line, the reduction of scrap can greatly improve yield and production, and there always remains a need to improve these two characteristics of any glass cutting line.

SUMMARY OF THE INVENTION

It is an object of the present invention to provide an efficient glass cutting line with automatic remnant storage and retrieval or recall.

One aspect of the present invention provides a glass cutting line including an automatic remnant storage and retrieval that comprises a workpiece feeding table with a conveyer for transporting workpieces along an X-axis along the longitudinal length of the workpiece feeding table; a glass cutting table adjacent the workpiece feeding table and receiving workpieces therefrom, the cutting table includes a bridge extending across the table configured for movement along the X-axis, and a carriage moveable along the bridge in an Y-axis perpendicular to the X-axis and with a cutting head on the carriage and movable within the XY plane to cut the glass workpieces and a conveyor for advancing the glass workpieces in the direction of the X-axis; a bi-directional table adjacent the cutting table in a direction of the X-axis and configured to receive workpieces from the conveyor of the cutting table, the bi-directional table including a selectively operable X-axis conveyor and a Y axis conveyor; a reclamation tilt unit adjacent the bi-directional table in the direction of the Y-axis and configured to receive remnants from the bi-directional table and move the remnants to a vertical orientation; a vertical cassette type storage rack with individual storage slots arranged along the Y-axis where remnants will be indexed and stored for future use, wherein the reclamation tilt unit is configured to feed the remnants to the individual slots; and a manual breakout table downstream along the X-axis of the bi-directional table configured to receive workpieces from the X-axis conveyor of the bi-directional table.

The glass cutting line according to invention may provide wherein the bi-directional table includes an X-axis breaking bar for the workpieces used to break the workpiece along a score line extending across the X-axis of the workpiece. The glass cutting line according to invention may further include a Y-axis breaking bar for the workpieces used to break the workpiece along a score line extending across the Y-axis of the workpiece, wherein the Y-axis breaking bar is upstream of the X-axis breaking bar in the direction of the X-axis.

The glass cutting line according to invention may further include vertical transfer with tilt load unit adjacent the storage rack and configured to retrieve remnants from the storage rack and deliver them to the feeding table. The glass cutting line according to the present invention may provide wherein Y-axis breaking bar for the workpieces is formed as an integrated squaring stop and Y-axis break breaking bar on the cutting table. The glass cutting line according to invention may provide wherein the integrated squaring stop and breaking bar is a retractable element and includes stops on a face thereof that form part of a glass workpiece locating system of the cutting table.

The glass cutting line according to invention may provide wherein the glass workpiece locating system of the cutting table includes wherein the glass cutting table conveyor is configured transports a rectangular glass workpiece against the squaring stops on the face of the bar whereby the stops are adapted to abut an edge of the glass workpiece which is positioned in the Y-axis substantially perpendicular to the transporting direction of the conveyor and will act to square the workpiece.

The glass cutting line according to invention may provide wherein the glass workpiece locating system of the cutting table further includes a movable edge sensor on the carriage adapted to sense an edge of the glass workpiece extending in the X-axis as the movable edge sensor is movable via the carriage in the Y-axis. The glass cutting line according to invention may further include wherein each slot of the storage rack is divided into three zones making up the full length of the rack, whereby each slot is capable of indexing up to three remnants per slot depending on the remnant size.

The glass cutting line according to invention may provide wherein the cutting table is configured for sub-plate cutting mode which provides the ability to cut portions of a stock sheet, and to release the cut portion in the form of a remnant and or individual workpieces to breakout before the entire sheet is finished scoring, without the sub-plate leaving the cutting table.

One aspect of the invention provides a glass cutting table comprising: a bridge extending across the table configured for movement along the X-axis; a carriage moveable along the bridge in a Y-axis; a cutting head on the carriage and movable within the XY plane to cut the glass workpieces; a conveyor for advancing the glass workpieces in the direction of the X-axis; and an integrated squaring stop and Y-axis break breaking bar configured to break the workpiece along a score line extending across the Y-axis of the workpiece, and configured to stop the workpiece in the X-axis for workpiece squaring.

The glass cutting table according to invention may provide wherein the integrated squaring stop and breaking bar is a retractable element and wherein the integrated squaring stop and breaking bar includes stops on a face thereof that form part of a glass workpiece locating system of the cutting table. The glass cutting table according to invention may provide wherein the glass workpiece locating system of the cutting table includes wherein the glass cutting table conveyor is configured transports a rectangular glass workpiece against the squaring stops on the face of the bar, whereby the stops are adapted to abut an edge of the glass workpiece which is positioned in the Y-axis substantially perpendicular to the transporting direction of the conveyor and will act to square the workpiece. The glass cutting table according to invention may provide wherein the glass workpiece locating system of the cutting table further includes a movable edge sensor on the carriage adapted to sense an edge of the glass workpiece extending in the X-axis as the movable edge sensor is movable via the carriage in the Y-axis. The glass cutting table according to invention may provide wherein the cutting table is configured for sub-plate cutting mode which provides the ability to cut portions of a stock sheet and to release the cut portion in the form of a remnant and or individual workpieces to breakout before the entire sheet is finished scoring without the sub-plate leaving the cutting table.

Another aspect of the invention provides a method of cutting workpieces on a cutting table comprising the steps of: Providing a glass cutting table that includes a bridge extending across the table configured for movement along the X-axis, and a carriage moveable along the bridge in an Y-axis perpendicular to the X-axis and with a cutting head on the carriage and movable within the XY plane to cut the glass workpieces and a conveyor for advancing the glass workpieces in the direction of the X-axis; Providing a workpiece to the glass cutting table and scoring the workpiece to provide at least one Y-axis score line extending across the workpiece; Severing the workpiece in a Y-axis break along a score line extending across the Y-axis of the workpiece while at least a portion of the workpiece upstream of the Y-axis break along the direction of the X-axis remains on the cutting table; Releasing the portion of the workpiece downstream of the workpiece from the cutting table; and Scoring the portion of the workpiece upstream of the Y-axis break subsequent to the release of the portion of the workpiece downstream of the workpiece from the cutting table.

These and other advantages of the present invention will be clarified in the brief description of the preferred embodiment taken together with the drawings in which like reference numerals represent like elements throughout.

DESCRIPTION OF THE PREFERRED EMBODIMENTS

Figures 1, 2, 3:
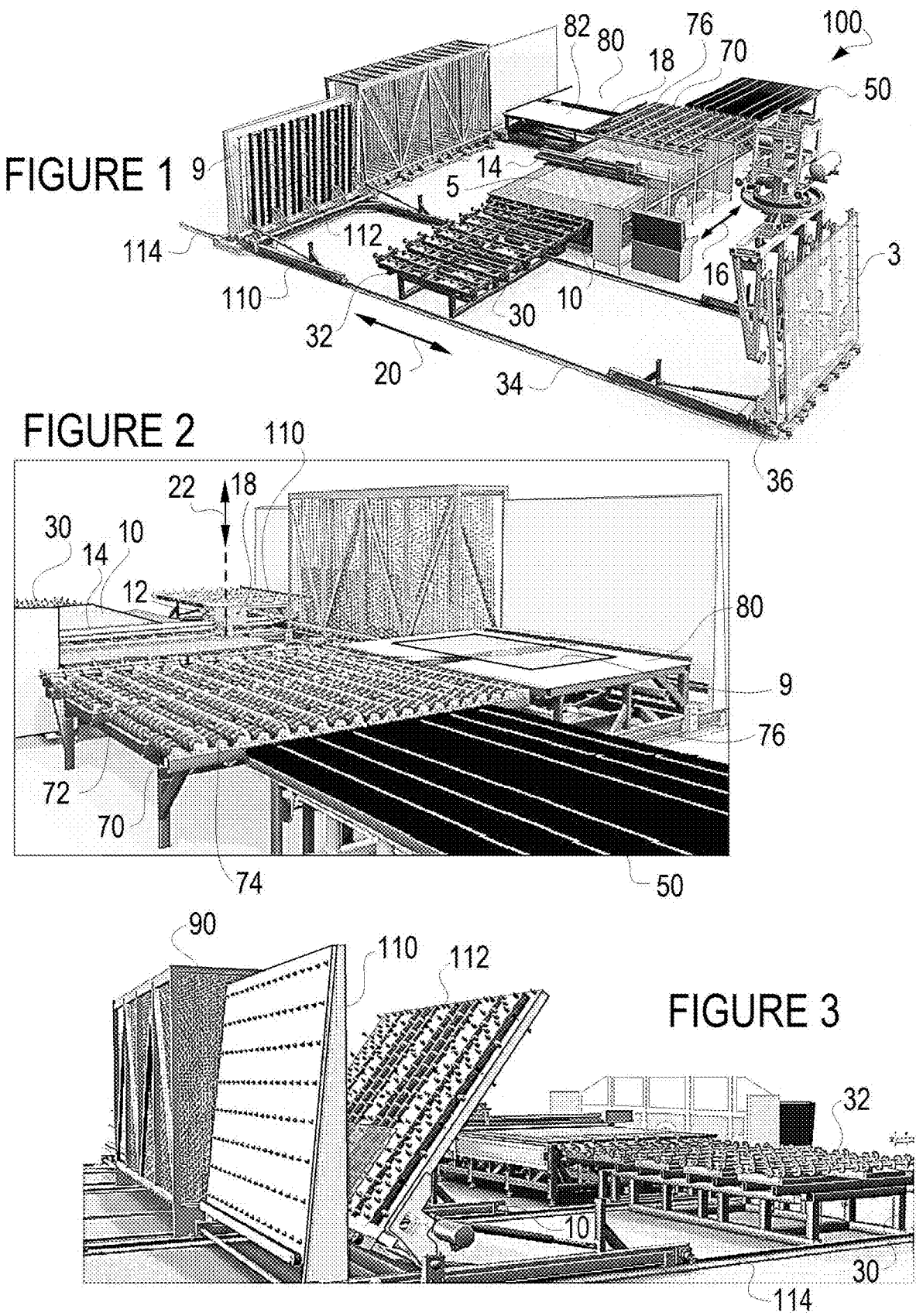
FIG. 1 is a perspective view of a glass cutting line with automatic remnant storage and recall according to the one embodiment of the present invention.
FIG. 2 is a perspective view of a bidirectional table and reclamation tilt unit of the glass cutting line with automatic remnant storage and recall according to FIG. 1.
FIGS. 3 and 4 are perspective views of a vertical transfer and tilt unit of the glass cutting line with automatic remnant storage and recall according to FIG. 1.

The present invention provides a glass cutting line 100 with automatic remnant storage and retrieval (or recall) that automatically identifies, stores, tracks, optimizes and reclaims remnants providing maximum cutting efficiencies and optimal yields, while minimizing unnecessary handling of remnants and idle time of the line 100.

The central component of the glass cutting line 100 is the glass cutting table 10 which is a glass processing apparatus that is configured to score or cut glass workpieces according to predefined patterns.

As discussed above workpieces within the meaning of this application references all glass workpieces throughout the glass processing process, including stock lites 3 (also called sheet or plates in the art), sub-plates 5, individual cut pieces 7 and remnants 9 (also called offal pieces or offcuts in the art). Sub-plates 5 within the meaning of this application is generally a stock lite 3, or theoretically a larger sub-plate 5 or larger remnant 9, from which a remnant 9 has been removed for storage or an individual cut piece 7 has been removed (or both), and wherein the sub-plate 5 remains on the cutting table 10 for further processing (scoring and cutting). A sub-plate 5 is a cut workpiece portion that is deemed available for immediate reuse such that no storage and retrieval of the sub-plate 5 is required. An individual cut piece 7 is essentially one final product of the cutting line 100. A remnant 9 is a cut workpiece portion that is deemed available for reuse and requires storage and retrieval.

The cutting patterns are generally prepared by a glass optimizing system, such as developed by Billco and available from HP3 Software under the BATCH BAN® trademark. The cutting table 10 includes an XY cutting head 12 is a glass cutting or scoring device, e.g. cutting wheel, which is movable within the XY plane to cut the glass workpieces. The table 10 has a bridge 14 extend across the table 10 for movement along the X-axis 16 (in this application the longitudinal direction along the table 10 is the X direction or X-axis 16) and a carriage 18 holding the cutting head 12 moveable along the bridge in the Y-axis 20.

The cutting head 12 can also move into and out of engagement with the workpiece along the Z-axis 22, and is numerically controlled according to the predetermined cutting pattern. The table 10 includes a belt conveyor 26 for advancing the glass workpieces (glass lites 3, sub-plates 5, individual cut pieces 7 and remnants 9). The belt conveyor 26 may be moveable in the Z-axis 22 to selectively engage the workpieces on the table 10.

A conventional feeding table 30 is in front of the cutting table 10 of a cutting line and a conventional break out table 50 downstream of the cutting table 10, however in the present invention the breakout table 50 is spaced from the cutting table 10 as discussed below. Traditionally a breakout table is where all the breaks occur, and in the line 100 the breakout table 50 is where the finished workpieces 7 are broken out. No remnant pieces 9 are sent to or broken out at the breakout table 50. Downstream in the context of the cutting line 100 is the direction of workflow of workpieces other than remnants 9 generally along the X-axis 16 from the feeding table 30 to the cutting table 10 to the bidirectional table 70 (discussed below) and to the breakout table 50. Upstream in the context of this application is the opposite of downstream, while the remnant storage system of the line 100 can be considered as taking a remnant from downstream at the table 70 and eventually returning it upstream to the feeding table 30 as discussed below.

The feeding table 30 includes a table conveyor 32, and a track 34 mounted pivoting tilt loader 36. The pivoting tilt loader 36 receives glass workpieces, such as from a gantry crane 38. The pivoting tilt loader 36 will typically receive the workpieces in a generally vertical orientation and delivers the glass workpieces to the conveyor 34 of the table 30 in a general horizontal orientation, whereby the conveyor 34 transports the glass workpieces to the cutting table 10. The tilt loader 36 of the feeding table 30 may be placed on tracks 34 to move the loader 36 toward where the workpieces can be loaded onto the loader 36. Other feeding tables are known in the art other than a tilt feeder and may be implemented in the present invention.

A key aspect of the invention is the provision of the cutting table 10 with integrated squaring stop and Y-axis break breaking bar 60 facilitating sub-plate 5 cutting. The sub-plate 5 cutting mode provides the ability to cut portions of a stock sheet 3 and release the cut portion (remnant 9 and or workpieces 7) to breakout before the entire sheet 3 is finished scoring. This streamlines glass flow, maximizing the cutting yield for the line 10. The glass optimizing system for the cutting line 100 will force remnants 9 to be positioned on a downstream side of the workpiece to facilitate the use of the bar 60.

The integrated squaring stop and breaking bar 60 is a retractable element, such as via pneumatic control, and includes stops 62 on the bar that form part of the glass workpiece locating system of the cutting table 10. The glass workpiece locating system of the cutting table 10 operates similar to that described in U.S. Pat. No. 6,202,524, which is incorporated herein.

The conveyor 26 transports a rectangular glass workpiece in the X-axis 16 transporting direction. The squaring stops 62 on the bar 60 are positioned to abut an edge of the glass workpiece which is positioned in the Y-axis 20, substantially perpendicular to the transporting direction 16 of the conveyor 26, and will act to square the workpiece. A movable edge sensor on the carriage 18 is adapted to sense an edge of the glass workpiece extending in the X-axis 16 as the movable edge sensor is movable via the carriage 18 in the Y-axis 20. After squaring the bar 60 may be retracted out of the flow of workpieces on the table 10.

The top of the bar 60 forms a Y-axis breaking bar for the workpieces meaning the bar 60 is used to break the workpiece along a score line extending across the Y-axis of the workpiece, also called a Y-break herein. The bar 60 may further include openings to accommodate the belts of the conveyor 26. The breaking bar 60 is used to allow for sub-plate 5 cutting on the cutting table of the remaining sub-plate 5. In addition to increasing yield by decreasing idle time, the use of the bar 60 for forming sub-plates 5 is an increase in edge quality of the final pieces as the system can make a Y-break before the entire workpiece has been scored. Edge quality decreases with the time till breakout and the breaking bar 60 thus can yield edge quality increase over prior systems.

The integrated squaring stop and breakout bar 60 may be retrofitted into existing cutting tables, where space allows, yielding some of the advantages of the present system, namely sub-plate cutting mode. It should be apparent that the sub-plate cutting mode can be implemented with the cutting table 10 and bar 60 without the remaining portions of the present remnant storage and retrieval system.

A bi-directional table 70 is located directly after the cutting table 10 and before the manual breakout table 50. The table 70 includes an X-axis conveyor 72, such as a belt conveyor, to convey workpieces to the breakout table 50 and a retractable Y-axis conveyor 74, such as roller conveyor, for conveying workpieces in the Y-axis direction. The Y-axis conveyor is used to convey remnants 9, or pieces containing remnants 9 to remnant storage. The table 70 also includes a breaking bar 76 which forms an X-axis breaking bar for the workpieces meaning the bar 76 is used to break the workpiece along a score line extending across the X-axis of the workpiece, called an X-break herein. The X-axis breaking bar 76 may be a pneumatically controlled element and is used to separate a remnant 9 from one or more individual workpieces 7. In operation the breaker bar 76 can operate similar to the breaking bar 60 generally without the need for squaring stops or squaring of the workpiece. From the table 70, the one or more individual workpieces 7 are sent, via conveyor 72, to the manual breakout table 50, while the remnant 9 is transferred, via conveyor 74, to the indexing reclamation tilt unit 80.

In operation, when the table 70 receives a workpiece containing only one or more individual workpieces 7, then the conveyor 72 transports the workpiece to the manual breakout table 50. When the table 70 receives a workpiece containing only a remnant 9 then the conveyor 74 transports the remnant 9 to the to the indexing reclamation tilt unit 80. When the table 70 receives a workpiece containing a remnant 9 and one or more individual workpieces 7 then (after conveyor 72 positions the workpiece) conveyor 74 transports the workpiece over the bar 76 with the portion to become the remnant 9 on the indexing reclamation tilt unit 80 and the one or more individual workpieces 7 remaining on the table 70. The bar 76 is used to break the workpiece along a score line extending across the X-axis of the workpiece, called an X-break herein, whereby the remnant is then received on the unit 80 and the one or more individual workpieces 7 remain on the table 70 for transport by conveyor 72 to the manual breakout table 50. The glass optimizing system for the line 100 also forces remnants 9 to be on the reclamation tilt unit 80 side of the workpieces to facilitate use of the bar 76.

The bi-directional table 70 allows the line 100 to be fully automated for remnant storage and retrieval with no manual handling. The system integrates into the optimization system which knows the location of all the remnants 9. The optimization will dictate the position of the remnant 9 in a dynamic database that will update with remnant 9 retrieval and remnant 9 shuffling.

As an alternative to providing the integrated squaring stop and breaking bar 60 in table 10, a separate Y-break breaking bar module could be used downstream on the bi-directional table 70. The cutting table would then use a conventional squaring system. This would allow for sub-plate 5 cutting mode but would increase cycle time over the current system.

The indexing reclamation tilt unit 80 sits adjacent to the bi-directional table 70 and receives the remnant 9 once separated. In order to orient the glass remnant 9 for the storage rack 90, the tilt unit 80 includes glass handling mechanism 82 that can rotate the glass 90° so the long edge is down along the X-axis 16. The tilt unit 80 then tilts to a vertical position, indexes (traverses or moves) on rails 84 to a proper position aligned with a proper location and X-axis conveyer 86 deposits the glass remnant 9 in the storage rack 90.

The storage rack 90 is a modular stationary vertical cassette type storage unit with individual slots 92 arranged along the y-axis 20 and is where remnants 9 will be indexed and stored for future use. The rack 90 is located between the reclamation tilt unit 80 and a vertical transfer unit 110. The stationary rack 90 allows the rack 90 to be modular and more stationary racks can be added to expand the system to provide as many storage locations as needed given there is sufficient floor space.

Each slot 92 is divided into three zones (e.g., A, B and C) making up the full length of the rack 90 whereby each slot 92 is capable of indexing up to 3 remnants 9 per slot 92 depending on the remnant 9 size, maximizing the capacity of the rack 90. For example, a remnant 9 having a y-axis length of less than ⅓ of the total zone length will take up one zone, a remnant 9 having a y-axis length of greater than ⅓ and less than ⅔ of the total zone length will take up two zones, while a remnant 9 having a y-axis length of greater than ⅔ of the total zone length will take up three zones. Thus a single slot 92 can store one two or three remnants 9 therein.

The storage rack 90 includes an X-axis roller conveyor 94 indexed on rails 96 to a proper position aligned with a proper slot 92 location then moveable in the Z-axis 22 to engage the remnants 9 and deliver the remnants 9 to and from the slots 92 of the storage rack 90. The system for the line 100 seamlessly tracks the age of coated glass reducing costly unnecessary labor dealing with oxidation.

The vertical transfer with tilt load unit 110 retrieves remnants 9 from the storage rack 90 when a remnant 9 is needed for the line 100 and transfers it from a vertical to horizontal position via tilt mechanism 112 and delivers it to the feeding table 30 of the cutting line 100. The unit 110 is analogous to unit 80 in that is moves on rails 114 to a proper position aligned with a proper slot 92 location and an X-axis conveyer 116 receives the glass remnant 9 from the storage rack 90.

The conveyor 116 of the unit 110 makes it easy to retrieve glass from a downstream zone when multiple lites are stored in a single slot. The non-wanted remnant 9 is removed from the slot 92 and held on the back side of the transfer or conveyor 116, while the desired remnant 9 is retrieved on the front side. The non-wanted glass remnant 9 will be re-indexed and the remnant 9 will be transferred back into the slot 92 (although it may now be in a different zone).

Figures 4, 5, 6:
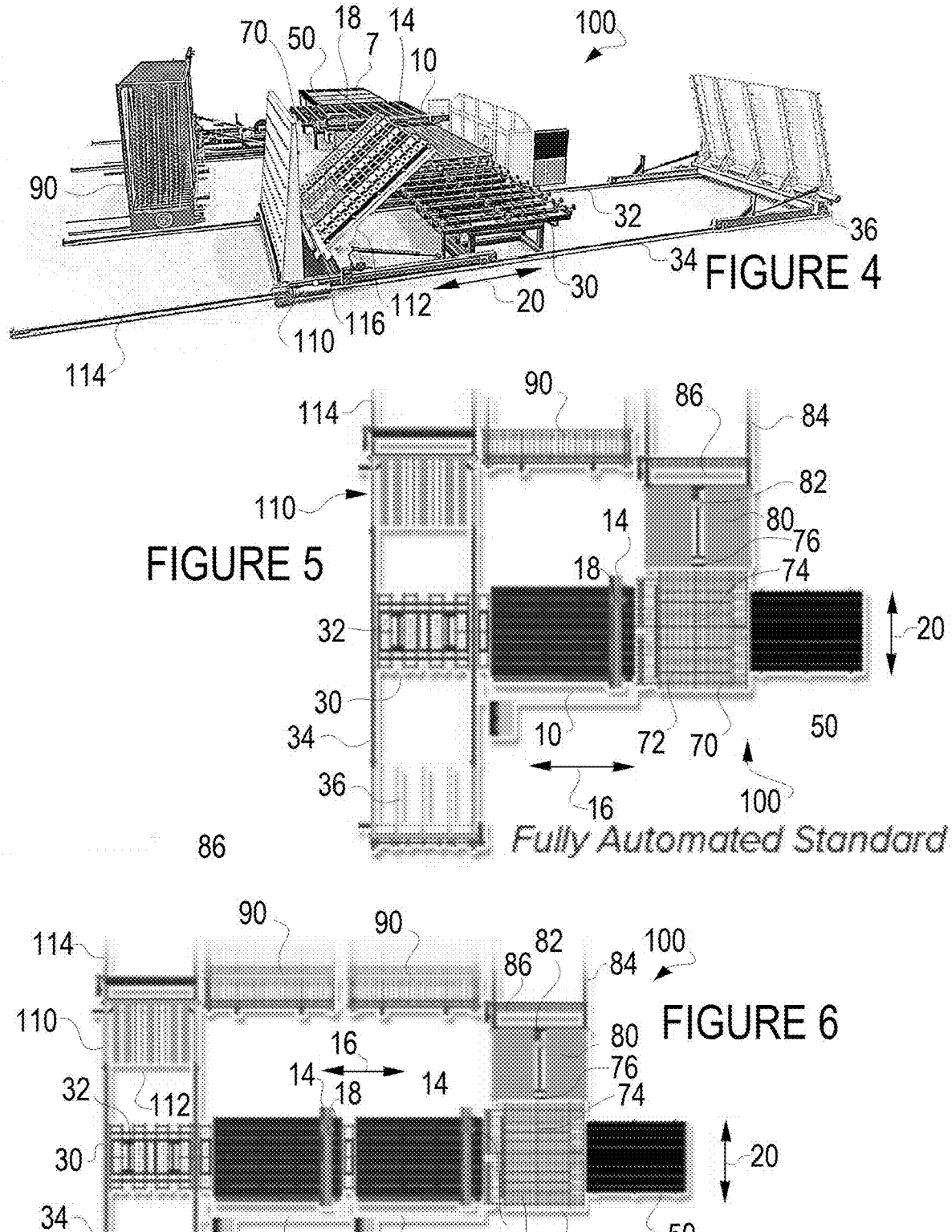
FIG. 5 is a top plan schematic view of the cutting line of FIG. 1.
FIG. 6 is a top plan schematic view of a modified version of the cutting line of FIG. 1.
Figure 7:
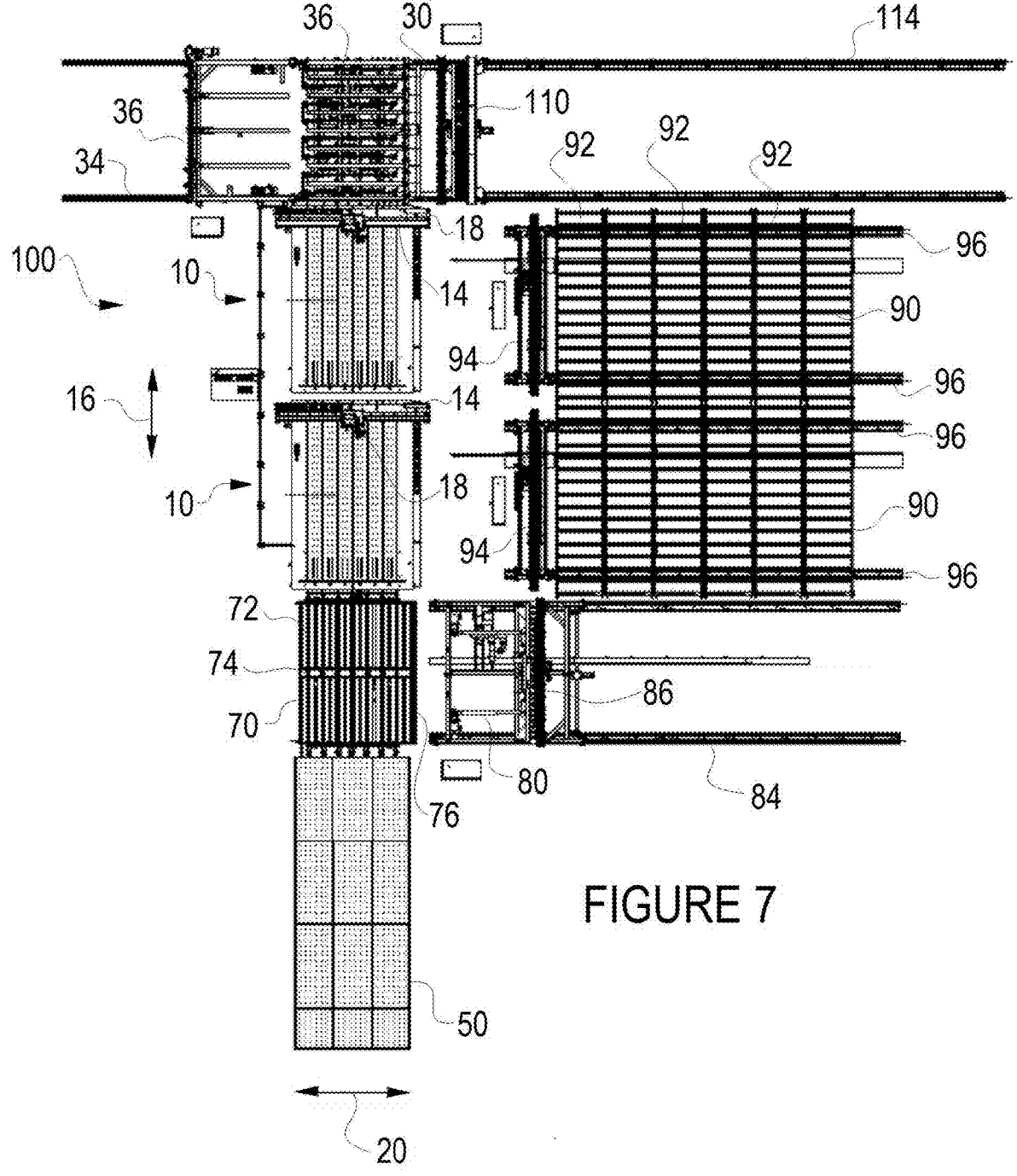
FIG. 7 is a top plan schematic view of a modified version of the cutting line of FIG. 1.
Figure 8:
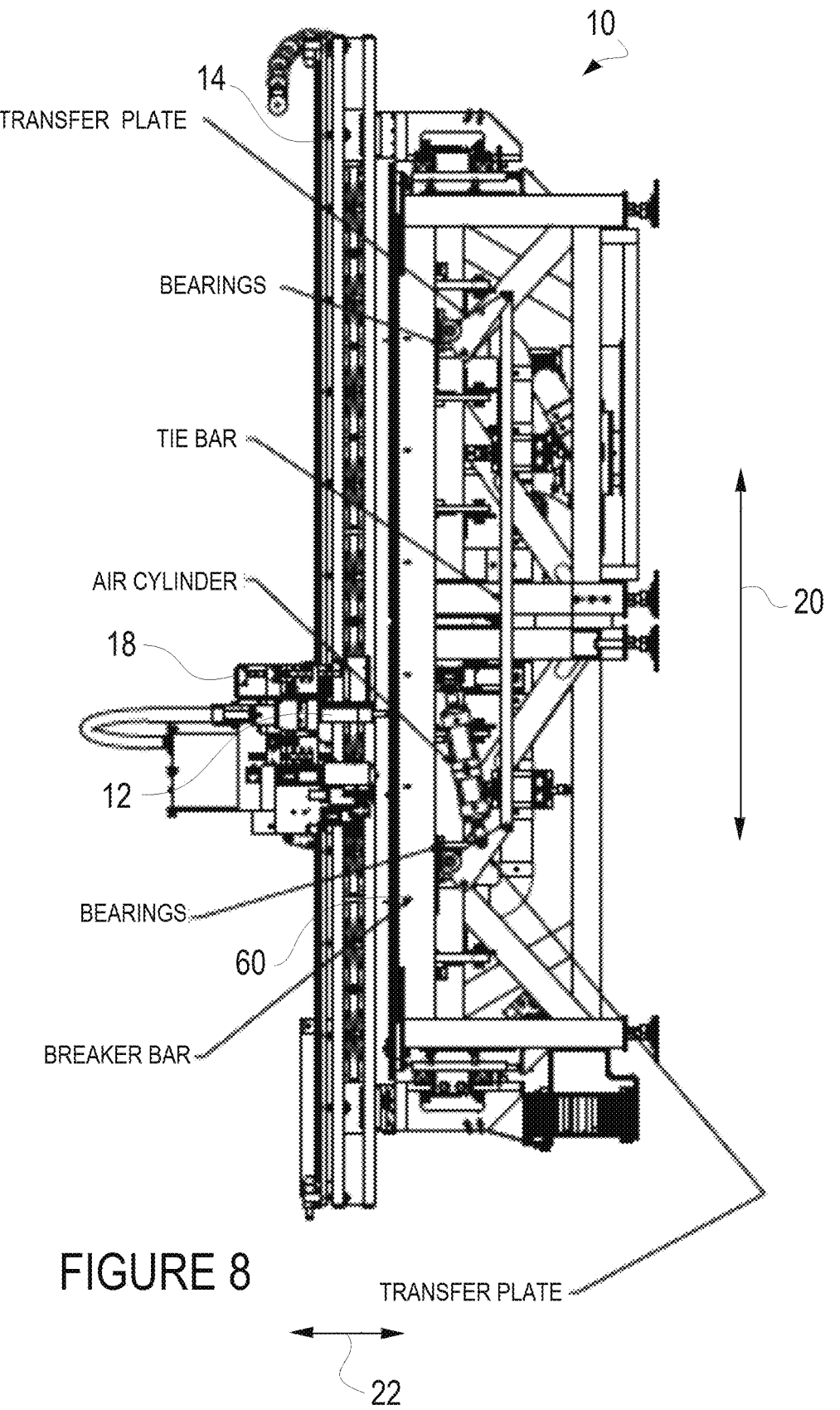
FIG. 8 is a side elevation schematic view of a cutting table with integrated breaking bar and stop according to the present invention.
Figure 9:
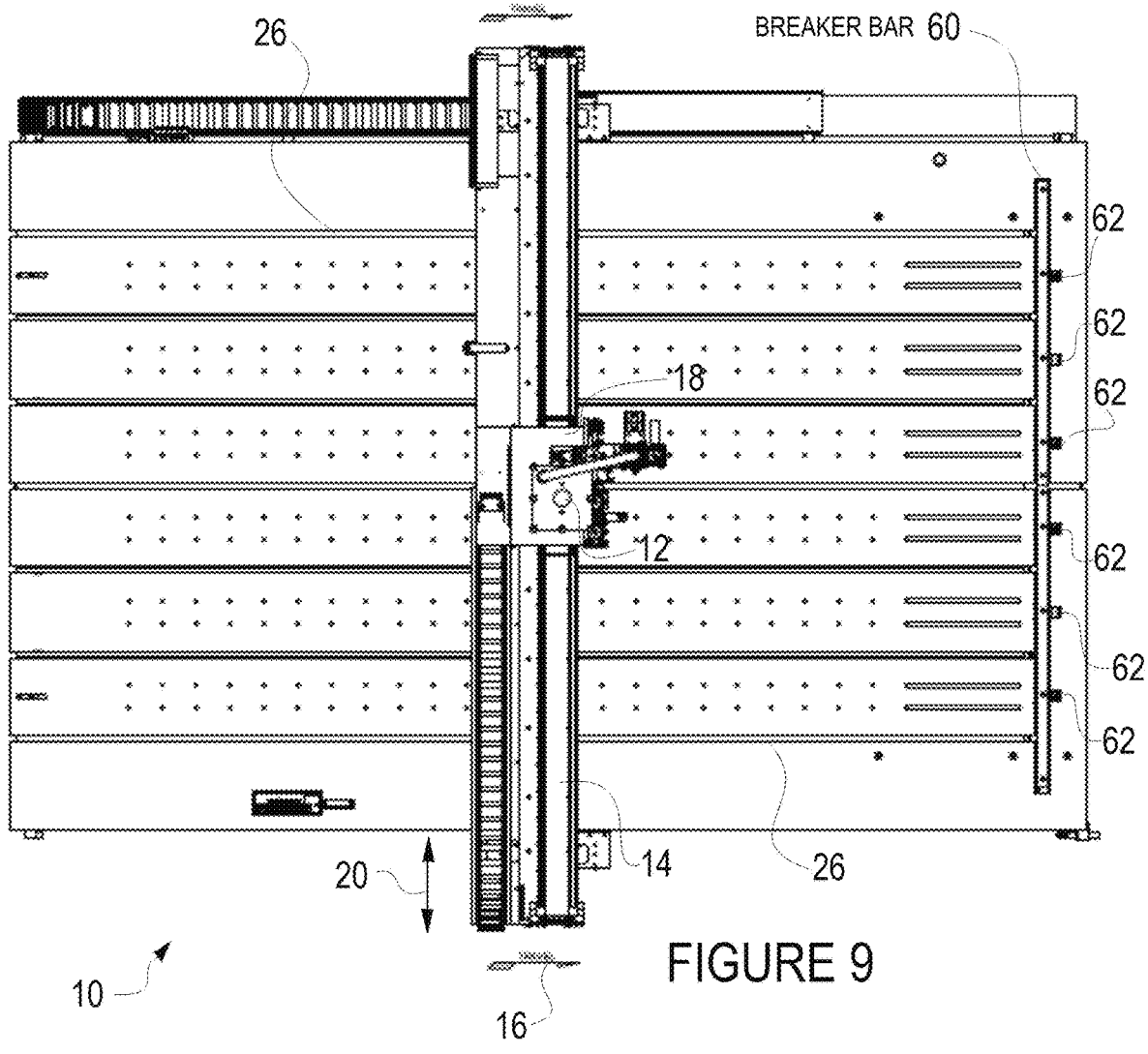
FIG. 9 is a top plan view of the cutter table of FIG. 8.

The present design is modular and additional storage racks 90 can be added as discussed above. Further FIG. 6 is a is a top plan schematic view of a modified version of the cutting line of FIG. 1 showing dual cutting tables 10 with longitudinally adjacent racks 90 showing the versatility of the present design. The dual cutter line of FIG. 6 has greater capacity and the remnant storage and retrieval system of the invention is even more significant to produce high yields on the line 100.

Other modifications include using a stationary modular storage rack(s) 90 adjacent the feeding table 30 for full stock sheets to increase the operation such that the system is not limited to the speed of the crane loading. In this embodiment the stationary modular rack(s) 90 feeding the feeding table 30 are moved into position and locked in place and utilized until empty and can be removed and refilled at another location.

Another modification of the present invention is the elimination of the unit 110 (due to space limitations—as it will decrease the efficiency of the overall system). In this modification the remnants 9 are retrieved and return to the cutting table via the unit 80 and table 70, operating effectively as the unit 110 and table 30. This modification is to demonstrate the versatility of the present system, but this layout is less optimal than the automated layouts shown in FIGS. 5 and 6.

It is noteworthy that even with the system 100 not every sheet will have remnants or utilize sub-plate cutting mode. The line 100 allows these options to be selectively used as needed to improve overall yield.

Although the present invention has been described with particularity herein, the scope of the present invention is not limited to the specific embodiment disclosed. It will be apparent to those of ordinary skill in the art that various modifications may be made to the present invention without departing from the spirit and scope thereof. The scope of the present invention should be defined by the appended claims and equivalents thereto.

What is claimed is:

1. A glass cutting table comprising:
   a bridge extending across the table configured for movement along an X axis;
   a carriage moveable along the bridge in a Y-Axis;
   a cutting head on the carriage and movable within an XY plane defined by the X-axis and the Y-axis to cut glass workpieces;
   a conveyor for advancing the glass workpieces in the direction of the X-axis; and
   a Y-axis breaking bar configured to break the workpiece along a score line extending across the Y-axis of the workpiece, and a squaring stop integrated with the Y-axis breaking bar and configured to stop the workpiece in the X-axis for workpiece squaring, whereby the Y-axis breaking bar and squaring stop form an integrated squaring stop and Y-axis breaking bar.

2. The glass cutting table according to claim 1 wherein the integrated squaring stop and Y-axis breaking bar is a retractable element.

3. The glass cutting table according to claim 2 wherein the integrated squaring stop and Y-axis breaking bar includes stops on a face thereof that form part of a glass workpiece locating system of the cutting table.

4. The glass cutting table according to claim 3 wherein the glass workpiece locating system of the cutting table includes wherein the glass cutting table conveyor is configured to transport a rectangular glass workpiece against the stops on the face of the integrated squaring stop and Y-axis breaking bar whereby the stops are adapted to abut an edge of the rectangular glass workpiece which is positioned in the Y-axis substantially perpendicular to the transporting direction of the conveyor.

5. The glass cutting table according to claim 4 wherein the glass workpiece locating system of the cutting table further includes a movable edge sensor on the carriage adapted to sense an edge of the rectangular glass workpiece extending in the X-axis as the movable edge sensor is movable via the carriage in the Y-axis.

6. The glass cutting table according to claim 5 wherein the cutting table is configured for sub-plate cutting mode which provides the ability to cut portions of a stock sheet and release the cut portion in the form of a remnant and or individual workpieces to breakout before the entire sheet is finished scoring without the sub-plate leaving the cutting table.

7. A glass cutting table having a longitudinal X-axis and a perpendicular Y-axis, the cutting table comprising:
   a conveyor configured for advancing glass workpieces in the direction of the X-axis;
   a bridge extending across the table configured for movement along the X-axis;
   a carriage moveable along the bridge in the Y-Axis;
   a cutting head on the carriage and movable within an XY plane defined by the X-axis and the Y-axis and configured to selectively cut the glass workpieces;
   a squaring stop configured to stop the workpiece in the X-axis for workpiece squaring;
   a Y-axis breaking bar configured to break the workpiece along a score line extending across the Y-axis of the workpiece, wherein the squaring stop is integral with the Y-axis breaking bar forming an integrated squaring stop and Y-axis breaking bar.

8. The glass cutting table according to claim 7 wherein the squaring stop is a retractable element.

9. The glass cutting table according to claim 7 wherein the Y-axis breaking bar is a retractable element.

10. The glass cutting table according to claim 7 wherein the integrated squaring stop and Y-axis breaking bar includes stops on a face thereof that form part of a glass workpiece locating system of the cutting table.

11. The glass cutting table according to claim 10 wherein the glass workpiece locating system of the cutting table includes wherein the glass cutting table conveyor is configured to transport a rectangular glass workpiece against the stops on the face of the integrated squaring stop and Y-axis breaking bar whereby the stops are adapted to abut an edge of the rectangular glass workpiece which is positioned in the Y-axis substantially perpendicular to the transporting direction of the conveyor.

12. The glass cutting table according to claim 11 wherein the glass workpiece locating system of the cutting table further includes a movable edge sensor on the carriage adapted to sense an edge of the rectangular glass workpiece extending in the X-axis as the movable edge sensor is movable via the carriage in the Y-axis.

13. The glass cutting table according to claim 12 wherein the cutting table is configured for sub-plate cutting mode which provides the ability to cut portions of a stock sheet and release the cut portion in the form of a remnant and or individual workpieces to breakout before the entire sheet is finished scoring without the sub-plate leaving the cutting table.

\* \* \* \* \*